United States Patent [19]
Pimpinella

[11] Patent Number: 5,960,130
[45] Date of Patent: Sep. 28, 1999

[54] METHOD OF TESTING SPLICE CONNECTIONS IN AN OPTICAL FIBER CABLE

[75] Inventor: Richard Joseph Pimpinella, Hampton, N.J.

[73] Assignee: Lucent Technologies Inc., Murray Hill, N.J.

[21] Appl. No.: 08/935,195

[22] Filed: Sep. 22, 1997

[51] Int. Cl.$^6$ .................................................. G02B 6/42
[52] U.S. Cl. ........................... 385/15; 385/134; 385/147; 385/135; 359/109; 359/110
[58] Field of Search ................ 385/15, 24, 134, 385/135, 147; 359/109, 110, 142, 147

[56] References Cited

U.S. PATENT DOCUMENTS

| | | | |
|---|---|---|---|
| 5,689,604 | 11/1997 | Janus et al. | 385/134 |
| 5,694,511 | 12/1997 | Pimpinella et al. | 385/134 |
| 5,712,942 | 1/1998 | Jemnnings et al. | 385/134 |

*Primary Examiner*—Phan Palmer

[57] ABSTRACT

A method of testing the quality of a splice at a remote location made between said optical cable and a subsequent optical cable. The method includes the step of connecting a first optical switch to the optical fibers contained within said cable. The first optical switch is connected to the optical fibers at a central office from where the optical cable originates. The first optical switch is connected to test equipment at the central office, wherein the first optical switch is capable of selectively connecting the test equipment to each of the optical fibers. A second optical switch is connected to the optical fibers in the subsequent optical cable on the opposite side of the splice. Portable test equipment is optionally connected to the second optical switch at the remote location. A portable controller is also taken to the remote location. The portable controller is used to control the first optical switch at the central office, via a telecommunications link. As a result, a person splicing an optical cable at the remote location can remotely instruct that cable to be tested in an automated manner from the central office. If the test shows a poor integrity in the splice, the cable can be cut and re-spliced until a quality splice is obtained.

19 Claims, 5 Drawing Sheets

METHOD OF TESTING SPLICE CONNECTIONS IN AN OPTICAL FIBER CABLE

RELATED APPLICATIONS

This application is related to the following:

U.S. patent application Ser. No. 08/935,220, entitled AN IMPROVED OPTICAL SWITCHING APPARATUS FOR USE IN THE CONSTRUCTION MODE TESTING OF FIBERS IN AN OPTICAL CABLE (Pimpinella-24) filed Sep. 22, 1997, which is herein incorporated into this disclosure by reference.

BACKGROUND OF THE INVENTION

1. Field of the Invention

The present invention relates to the methods involved in connecting the optical fibers in an optical cable to a Remote Fiber Test System (RFTS), via an optical switch, when the optical fibers are being laid, repaired or otherwise altered.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are optical couplings that receive the ends of all of the individual optical fibers that enter the central office and are contained within the optical fiber network. By terminating each optical fiber at a coupling on one of the different fiber distribution shelves, the location of each optical fiber becomes known within the overall assembly. Once terminated at a known address on one of the fiber distribution shelves, each optical fiber can be selectively coupled to an HDT or a variety of other optical equipment located at the central office. As a result, the optical signals sent along each optical fiber can be selectively controlled.

As an optical fiber cable is connected between the optical distribution frame at the central office and the various ONUs at remote locations, the many optical fibers contained within the fiber cable must be spliced at different points along the path. For example, the optical fibers in an optical fiber cable are typically spliced to connector fibers at the outside cable entrance facility (OCEF), where the optical fiber cable enters the central office. The connector fibers extend through conduits in the central office and lead to the optical fiber distribution frame. The various optical fibers are also commonly spliced at one or more manhole locations in between the central office and a grouping of ONUs. As such, most every optical fiber is spliced in more than one location in between the central office and each ONU.

When an optical fiber cable is newly laid, repaired, sliced or otherwise altered, it is important to check the optical integrity in between the central office and each ONU. As a result, each time an optical fiber cable is altered, the integrity of the overall optical pathway must be tested. In many applications, an optical cable exiting the central office contains several different optical ribbons. Each of the ribbons contains a plurality of individual optical fibers, for example, twelve (12) individual optical fibers. When an optical cable is spliced, the cable is cut open and each of the optical ribbons contained within that cable are spliced individually. As such, when one optical ribbon is spliced to another, several different individual optical fibers are being spliced during that operation. If any one of the optical fibers in the optical ribbon fails to splice properly, either that ribbon or the entire optical cable must be cut and re-spliced.

In the prior art, the testing of the integrity and quality of a splice is performed after each splice is completed. Traditionally, such a testing procedure required at least two individuals. One person is the splicer who splices the cable a manhole or at some other remote location. The second person would be in charge of the test equipment at the central office. The two people would be in communications with one another. When the splice of a single optical ribbon were complete, the tester at the central office would hook the test equipment to the optical fibers involved in the splice. Testing would then be performed, whereby the integrity of each of the optical pathways could be tested.

In the past, the various optical fibers in a ribbon would be connected to test equipment using an optical switching device such as that described in U.S. patent application Ser. No. 08/709,943, to Pimpinella et al. now U.S. Pat. No. 5,694,511, entitled Optical Switching Apparatus And Method For Use In The Construction Mode Testing Of A Modular Fiber Administration System, the disclosure of which is herein incorporated into this specification by reference. The purpose of such optical testing devices is to connect a single optical testing device to multiple optical fibers and then to switch the testing device to the different optical fibers while testing is being performed. Such optical testing devices therefore have a single optical input that connects to the testing equipment and multiple optical leads that connect to the various optical fibers.

In the central office, the space available on any one fiber distribution shelf is very limited. A typical optical cable contains at least seventy two (72) optical fibers. These fibers are contained within at least six separate optical ribbons. To connect the equipment to the optical cable, at least seventy two optical leads must be run between the testing equipment and the fiber distribution shelf. The management of at least seventy two leads in such a confined space is very difficult and the leads often become tangled and unmanageable. It is for this reason that optical switching devices at the central office are typically connected to just one optical ribbon at a time. An optical ribbon typically contains twelve optical fibers. As a result, the person at the central office need only connect twelve leads before testing can occur. After the test is completed, the person at the central office removes the leads from the optical fibers of the first optical ribbon and reconnects those leads to the optical fibers of the next optical ribbon to be tested. As such, in the prior art, such testing is often a time and labor-intensive undertaking.

A need, therefore, exists in the art for a testing method that is capable of all of the optical fibers contained in an optical cable at the same time. Thereby eliminating the step of having to change test equipment from one optical ribbon to another in a testing cycle. A need also exists for a more automated testing procedure that can reduce the number of individuals needed to test an optical cable down to one tester.

SUMMARY OF THE INVENTION

The present invention is a method of testing the quality of a splice at a remote location made between said optical cable and a subsequent optical cable. The method includes the step of connecting a first optical switch to the optical fibers contained within said cable. The first optical switch is connected to the optical fibers at a central office from where the optical cable originates. The first optical switch is connected to test equipment at the central office, wherein the first optical switch is capable of selectively connecting the test equipment to each of the optical fibers. The portable controller is used to control the first optical switch at the central office, via a telecommunications link. As a result, a person splicing an optical cable at the remote location can remotely instruct that cable to be tested in an automated manner from the central office. If the test shows a poor integrity in the splice, the cable can be cut and re-spliced until a quality splice is obtained.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
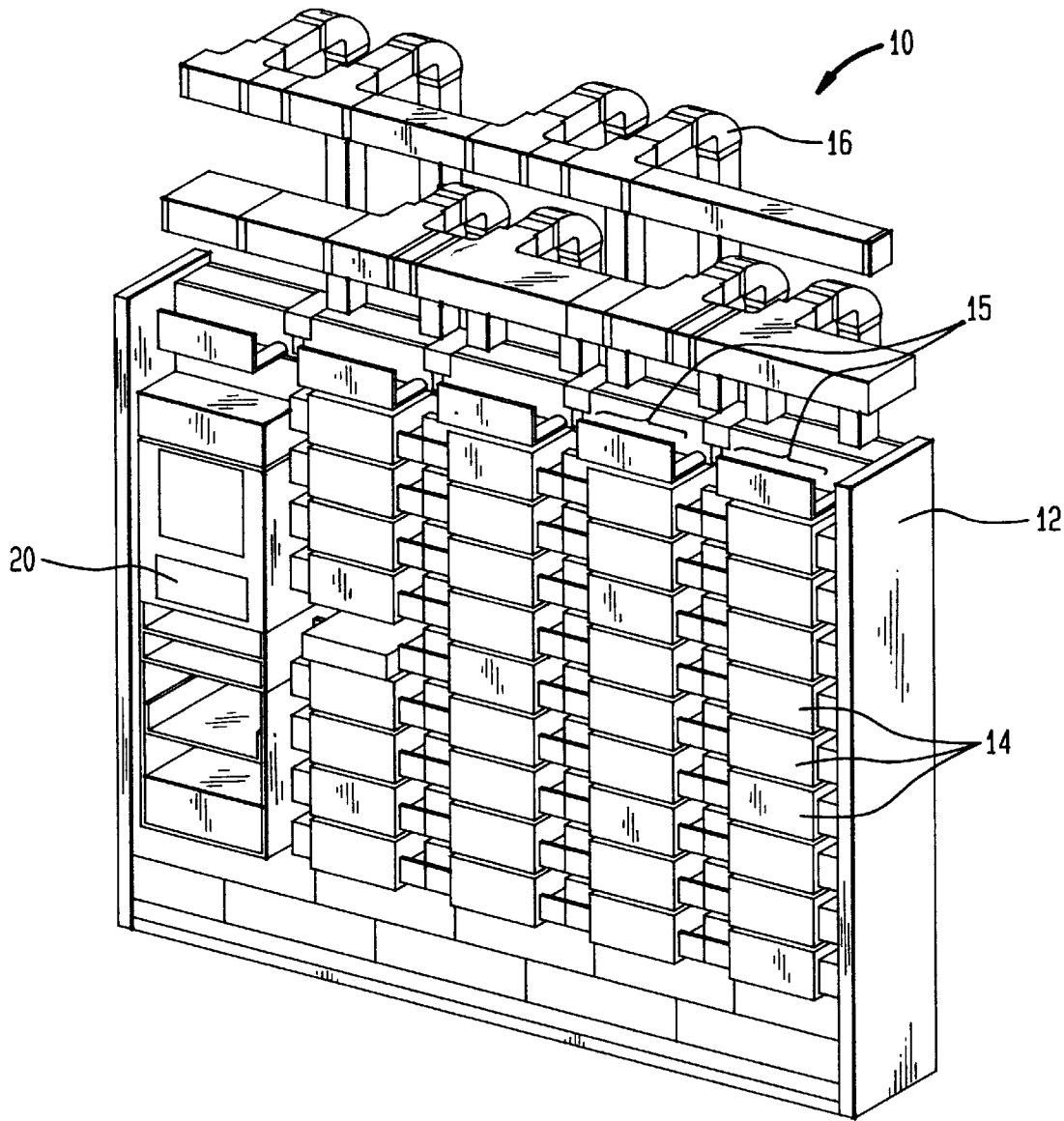
FIG. 1 is a perspective view of a prior art optical fiber distribution frame typical of those located in central offices of an optical fiber network.

In FIG. 1, a fiber administration system 10 is shown. Such administration systems are exemplified by the disclosures of U.S. patent application Ser. No. 08/645,108, entitled AN OPTICAL COMMUNICATIONS SYSTEM HAVING DISTRIBUTED INTELLIGENCE, filed May 13, 1996, now U.S. Pat. No. 5,712,942 and U.S. patent application Ser. No. 08/709,978, now U.S. Pat. No. 5,689,604 entitled FIBER OPTIC OPERATIONS CENTER, filed Sep. 9, 1996. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the optical fiber network to the fiber distribution shelves 14.

Contained within the framework of the optical fiber administration system 10 is an optical time domain reflectometer (OTDR) 20 that is used in the testing of the various optical fibers that are part of the fiber administration system 10.

Figure 2:
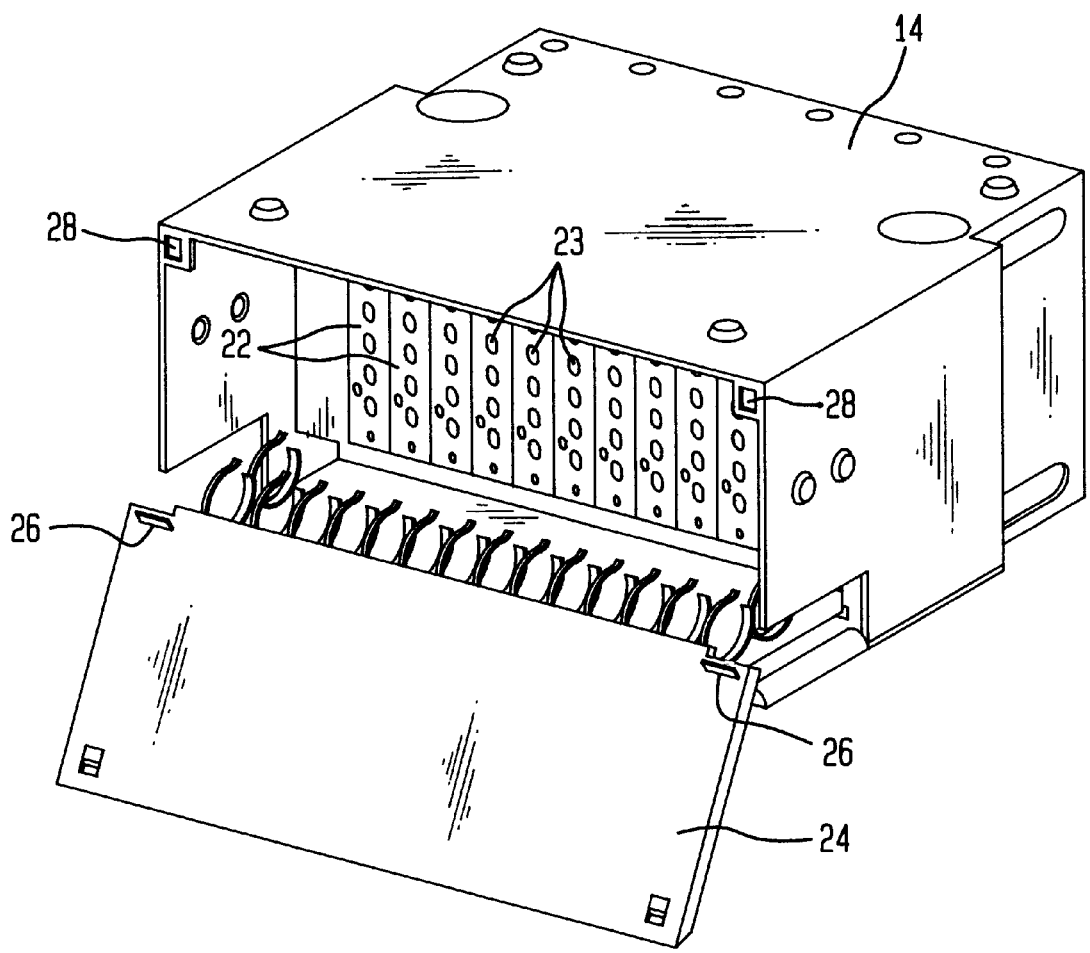
FIG. 2 is a perspective view of a prior art fiber distribution shelf contained within the optical fiber distribution frame of FIG. 1.

Referring to FIG. 2 a typical prior art fiber distribution shelf 14 is shown. The shelf 14 contains a rack of connection modules 22 that receive the various optical fibers contained within an optical cable. Each optical fiber from an optical cable terminates on a distribution shelf at a connector port 23. The connector ports are disposed on the face of the connection modules 22. A protective faceplate 24 connects to the front of the fiber distribution shelf 14 and prevents accidental contact with any optical leads that connect to the connector ports 23 on the connection modules 22. The faceplate 24 engages C-shaped hinge elements 26 disposed on the bottom front edge of the fiber distribution shelf 14. The faceplate 24 pivots about the C-shaped hinge elements 26 to a closed position where the faceplate completely covers the open end of the fiber distribution shelf 14. Once in a closed position, the faceplate 24 engages two locking ports 28 that are disposed near the top front edge of the fiber distribution shelf 14.

Figure 3:
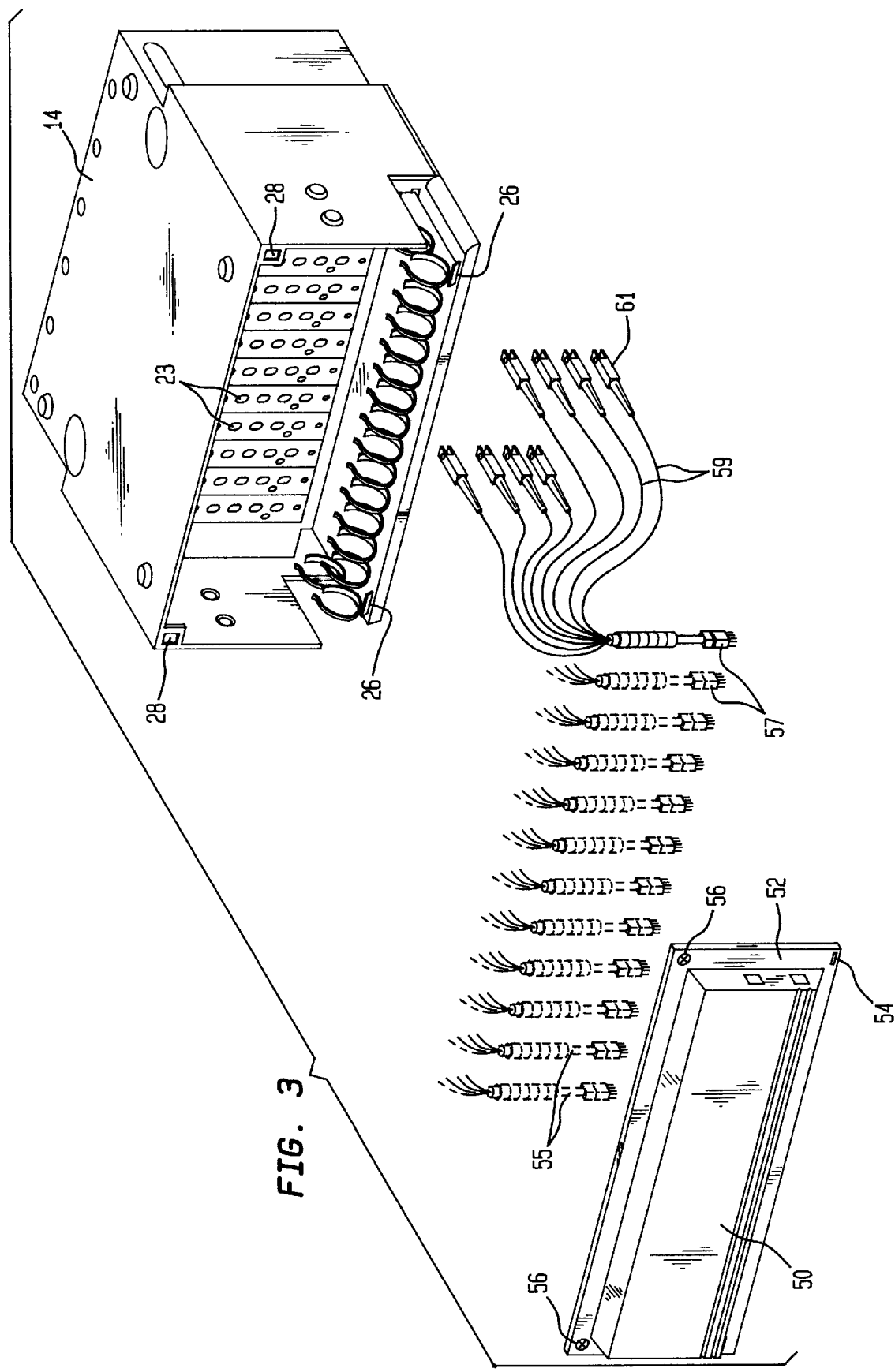
FIG. 3 is a perspective view of a one exemplary embodiment of the present invention optical switch device shown in conjunction with a prior art fiber distribution shelf.

Referring to FIG. 3, an exemplary optical switching device 50 is shown in accordance with the present invention. The optical switching device 50 is shown in conjunction with a standard fiber distribution shelf 14, such as that previously shown and described in FIG. 2. The optical switching device 50 is affixed to a support plate 52 that is configured with peripheral dimensions that mimic the dimensions of a prior art faceplate 24 (FIG. 2). Accordingly, the support plate 52 has hinge pivots 54 that engage the C-shaped hinge elements 26 on the bottom front edge of the fiber distribution shelf 14. Similarly, the support plate 52 contains twist locks 56 that engage the locking apertures 28 that are disposed on the front top edge of the fiber distribution shelf 14. It will therefore be understood that the optical switching device 50 can be placed in front of a fiber distribution shelf 14 by removing the faceplate 24 (FIG. 2) that normally covers the open front of the shelf and replacing that faceplate with the support plate 52 that supports the optical switching device 50.

Fan-out adapters 55 are provided. The fan-out adapters 55 interconnect the optical components contained within the optical switching device 50 with the various connector ports 23 on the fiber distribution shelf 14. As will be later described in more detail, the fan-out adapters 55 contain a single optical connector base 57 that attaches to the optical switching device 50. Optical leads 59 extend from the base connector 57, wherein each of the leads terminates with a plug connector 61 that is adapted to engage a connector port 23 on the fiber distribution shelf 14.

Figure 4:
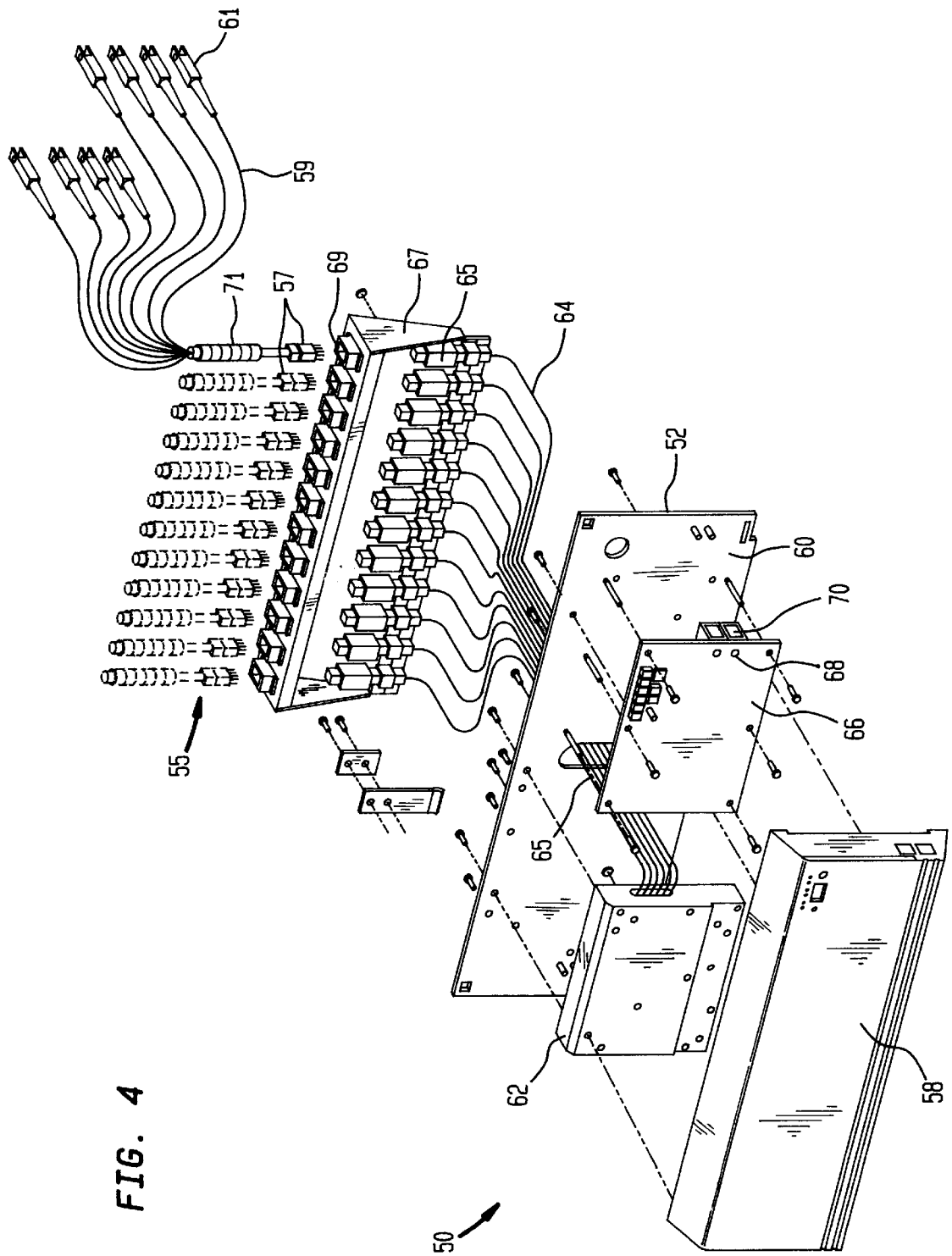
FIG. 4 is an exploded perspective view of one exemplary embodiment of the present invention optical switch device.

Referring to FIG. 4. it can be seen that a housing 58 is provided that defines a chamber against the front surface 60 of the support plate 52. Contained within the chamber are the elements that create an optical switch. The form and function of an optical switch is well known in the prior art and need not be set forth herein. However, in the shown embodiment, the optical switch is divided into two distinct modules under the housing 58. The first module is an optical switching module 62 that contains most of the fiber optics and optical circuitry common to an optical switch. A plurality of test leads 64 extend from the optical module 62. The test leads 64 extend through an aperture 65 in the support plate 52. The second module is an electronic control module 66 that controls the optical switching module 62. At the side of the electronic control module is an electrical connector 68 and an optical connector 70. The electrical connector 68 provides a means for supplying electronic control signals to the optical switch device 50. The optical connector 70 provides a means for supplying an optical test signal to the optical switch device 50, wherein the optical switch device 50 selectively directs the optical test signal to the various leads 64 that extend from the optical switching module 62.

Each of the test leads 64 extending from the optical switching module 62 terminate at a plug connector 65. A connector tray 67 is affixed to the rear of the support plate 52. An plurality of receptacle connectors 69 are positioned along the length of the connector tray 67. The number of receptacle connectors 69 is the same as the number of test leads 64. The plug connectors 65 at the end of the test leads 64 connects to the bottom of the receptacle connectors 69. These connections are isolated in between the support plate 52 and the structure of the connector tray 67.

The tops of the receptacle connectors 69 are adapted to receive the base connector 57 of a fan-out adaptor 55. The base connector 57 of each fan-out adaptor 55 has an elongated rigid body 71 that forms a handle element and makes the base connector 57 easy to hold and manipulate. Accordingly, the base connector 57 of each fan-out adaptor 55 can be readily engaged or disengaged with the receptacle connectors 69 on the connector tray 67. A plurality of optical leads 59 extend from the top of each base connector 57. Each of the optical leads 59 terminates with a connector port plug 61 that is sized to engage the connector ports 23 on the fiber distribution shelf 14 (FIG. 3). Depending upon the age and manufacturer of the fiber administration system, the connector ports on the fiber distribution shelf can have one of a few different configurations. The connector port plugs 61 at the ends of the leads on the fan-out adaptor are selected to match the connector port configuration of the system.

Although the optical switch device 50 as described can be used on any prior art fiber administration system that used standard sized fiber distribution shelves, the optical switch device is preferably used in a fiber administration system with distributed intelligence, such as that described in U.S. patent application Ser. No. 08/645,108 now U.S. Pat. No. 5,712,942, entitled AN OPTICAL COMMUNICATIONS SYSTEM HAVING DISTRIBUTED INTELLIGENCE, filed May 13, 1996 and U.S. patent application Ser. No. 08/709,978 now U.S. Pat. No. 5,689,604, entitled FIBER OPTIC OPERATIONS CENTER, filed Sep. 9, 1996, both of which being previously incorporated by reference. In such a modular fiber administration system, an optical time domain reflectometer is provided as part of the system, as is a systems controller able to produce any required test signal sequence. As a result, when the optical switching device is joined to such a fiber administration system, the optical connector leading into the optical switching device can be coupled to the optical time domain reflectometer that serves the overall administration system. Furthermore, the electrical connector that leads into the optical switching device can be coupled to the systems controller that serves the overall fiber administration system. Consequently, the optical switching device can be addressed and controlled by the programming of the systems controller. This eliminates the need for a separate optical time domain reflectometer and a separate controller, as was require in certain prior art testing systems.

Figure 5:
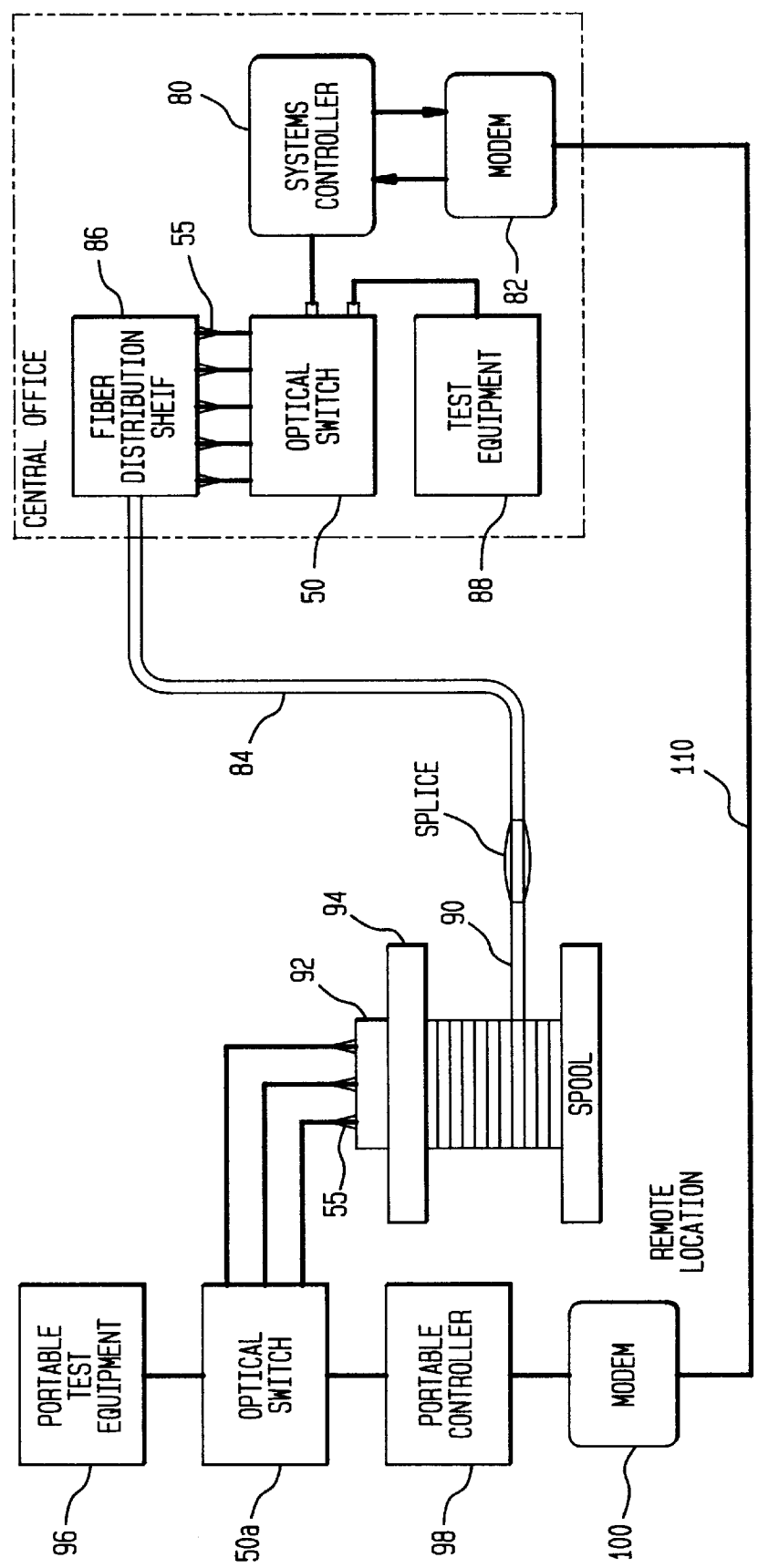
FIG. 5 is a schematic illustrating a method of testing in accordance with the present invention.

Referring to FIG. 5, it can be seen that the systems controller 80 of the fiber administration system can also be accessed by a modem 82. Consequently, command controls can be sent to the optical switch 50 at the central office end of an optical cable 84 from a remote location, via the systems controller 80 and its modem 82.

To use the present invention method, a person intending to lay a new cable terminates the various optical fibers of that cable at a fiber distribution shelf 86 in a central office. As such, each optical fiber contained within that cable is terminated at a different connector port on the fiber distribution shelf 86. The optical switch device 50 previously described is then attached to the fiber distribution shelf 86. The fan-out adapters 55 are first connected to each of the connector ports on the fiber distribution shelf 86. Once a connection is made to every connector port that leads to an optical fiber, the fan-out adapters 55 are connected to the optical switch 50. The optical input port of the optical switch 50 is coupled to the OTDR or other testing equipment 88 contained within the fiber administration system. The electronic input port of the optical switch 50 is connected to the system controller 80 of the fiber administration system.

After one optical switch 50 has been connected to the fibers at one end of an optical cable 84 at the central office, a tester can then go to remote locations and splice a subsequent optical cable 90 to the initial optical cable. Subsequent cables 90 are typically wound on spools and have one preterminated end, wherein the terminations are accessible on the hub 92 of the spool 94. At the remote location, the tester can splice the subsequent optical cable 90 to the existing optical cable 84. The splicing is done one optical ribbon at a time.

Depending upon the type of testing to be performed, the tester at the remote location can also connect a second optical switch 50A to the predetermined end of the new cable spool. As within the central office, fan-out adapters 55 are first connected to the terminations at the ends of the spool. Once connected, the fan-out adapters 55 are connected to the optical switch 50A in the manner previously described. The optical input port of the optical switch 50A can be optionally connected to portable testing equipment 96 if the testing procedure requires testing equipment at both ends of the table.

The tester at the remote location brings a portable controller 98 to the remote location. The portable controller 98 contains a modem 100. A telecommunications link 110 is established in between the modem 100 of the portable controller 98 and the modem 82 of the systems controller 80 at the central office. Once this telecommunications link 110 is established, the tester at the remote location can instruct the test equipment 88 at the central office to begin a testing cycle. The results of the test can then be forwarded to the portable controller 90 at the remote location, wherein the splice at the remote location can be repaired if needed. The tester at the remote location can also control the first optical switch 50 at the central office. That same tester also has direct control of the second optical switch 50A and any optional test equipment at his/her end of the optical cable 84. Consequently, a single tester can initialize and conduct integrity testing between a central office and a remote location for all the optical fibers in an optical cable. No tester at the central office is required.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. In an optical fiber network where an optical cable originates at a central office, a method of testing the quality of a splice at a remote location made between said optical cable and a subsequent optical cable, comprising the steps of:

connecting a first optical switch at said central office to the optical fibers contained within said cable;

connecting said first optical switch to test equipment at said central office, wherein said optical switch is capable of selectively connecting the test equipment to each of the optical fibers; and controlling said first optical switch from a portable controller at said remote location that communicates with said first optical switch with a telecommunications link.

2. The method according to claim 1, further including the step of connecting a second optical switch to said optical fibers at said remote location.

3. The method according to claim 2, wherein said step of connecting a second optical switch includes the substeps of:

providing adapters;

connecting the adapters to the optical fibers in said subsequent optical cable at said remote location; and connecting said adapters to said second switch.

4. The method according to claim 3, wherein each of said adapters has at least six connectors that connect to optical fibers and only one connector that connects to said second optical switch.

5. The method according to claim 2, further including the step of controlling said second optical switch at said remote location with said portable controller, wherein said portable controller synchronizes the operation of the first optical switch and said second optical switch.

6. The method according to claim 1, further including the steps of controlling said test equipment at said central office with said portable controller at said remote location.

7. The method according to claim 6, wherein said first optical switch and said test equipment at said central office are part of a fiber administration system controlled by a central processor, wherein said remote controller communicates with and instructs said central processor via said telecommunications link.

8. The method according to claim 1, wherein said step of connecting a first optical switch includes the substeps of:

providing adapters;

connecting the adapters to the optical fibers in said optical cable at said central office; and connecting said adapters to said first optical switch.

9. The method according to claim 8, wherein each of said adapters has at least six connectors that connect to optical fibers and only one connector that connects to said first optical switch.

10. A method of testing the integrity of a splice at a remote location of an optical pathway, wherein the optical pathway extends from a fiber administration system at a central office to the remote location, comprising the steps of:

coupling testing equipment to the beginning of said optical path at said central office, wherein said testing equipment is controlled by a central processor in said fiber administration system;

establishing a telecommunications link between a portable controller at said remote location and said central processor of said fiber administration system;

instructing said testing equipment at said central office to test said optical pathway from said portable controller at said remote location; and forwarding the results of the test to said portable controller at said remote location, wherein the splice at the remote location can be repaired if needed.

11. The method according to claim 10, further including the step of connecting portable testing equipment to said optical fibers at said remote location.

12. The method according to claim 11, wherein said step of connecting portable testing equipment to the optical fibers includes coupling each of said optical fibers and said test portable equipment to a second optical switch.

13. The method according to claim 12, wherein the step of coupling each of said optical fibers to said second optical switch includes the substeps of:

providing adapters;

connecting the adapters to the optical fibers; and connecting said adapters to said second optical switch.

14. The method according to claim 13, wherein each of said adapters has at least six connectors that connect to optical fibers and only one connector that connects to said second optical switch.

15. The method according to claim 10, wherein said step of coupling testing equipment to the beginning of said optical path at said central office, includes coupling each of said optical fibers and said test equipment to an optical switch.

16. The method according to claim 15, wherein the step of coupling each of said optical fibers to an optical switch includes the substeps of:

providing adapters;

connecting the adapters to the optical fibers; and connecting said adapters to said optical switch.

17. The method according to claim 16, wherein each of said adapters has at least six connectors that connect to optical fibers and only one connector that connects to said optical switch.

18. The method according to claim 10, wherein said optical pathway is an optical cable containing at least seventy two optical fibers.

19. The method according to claim 10, wherein said optical switch device is configured to attach to a fiber distribution shelf in said fiber administration system.

* * * * *